US008423530B2

(12) United States Patent
Midgley

(10) Patent No.: US 8,423,530 B2
(45) Date of Patent: Apr. 16, 2013

(54) SEARCHING IN A COMPUTER NETWORK

(75) Inventor: Nicholas J. Midgley, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/396,084

(22) Filed: Feb. 14, 2012

(65) Prior Publication Data

US 2012/0150902 A1 Jun. 14, 2012

Related U.S. Application Data

(63) Continuation of application No. 10/990,779, filed on Nov. 16, 2004, now Pat. No. 8,140,563.

(30) Foreign Application Priority Data

Nov. 27, 2003 (GB) .................................. 0327589.8

(51) Int. Cl.
*G06F 17/30* (2006.01)
(52) U.S. Cl.
USPC ............ 707/706; 707/729; 707/736; 707/769
(58) Field of Classification Search .................. 707/706, 707/729, 736, 769
See application file for complete search history.

(56) References Cited

U.S. PATENT DOCUMENTS

| 5,905,862 | A | 5/1999 | Hoekstra |
| 6,085,186 | A | 7/2000 | Christianson et al. |
| 6,430,556 | B1 * | 8/2002 | Goldberg ......................... 707/4 |
| 6,457,009 | B1 * | 9/2002 | Bollay ........................... 707/770 |
| 6,882,995 | B2 * | 4/2005 | Nasr et al. ..................... 707/713 |
| 6,920,448 | B2 * | 7/2005 | Kincaid et al. ......................... 1/1 |
| 7,203,678 | B1 | 4/2007 | Petropoulos et al. |
| 2002/0049756 | A1 | 4/2002 | Chua et al. |
| 2003/0023755 | A1 * | 1/2003 | Harris et al. .................. 709/246 |
| 2003/0050959 | A1 | 3/2003 | Faybishenko et al. |
| 2003/0055818 | A1 | 3/2003 | Faybishenko et al. |
| 2003/0204497 | A1 | 10/2003 | Kalogeraki et al. |
| 2004/0133564 | A1 | 7/2004 | Gross et al. |
| 2005/0120016 | A1 | 6/2005 | Midgley |

FOREIGN PATENT DOCUMENTS

WO 02/091241 A2 11/2002

OTHER PUBLICATIONS

Powell, J. et al., "Multilingual Federal Searching Across Heterogenous Collections", Sep. 1998 XP002255043.

* cited by examiner

*Primary Examiner* — John E Breene
*Assistant Examiner* — Andalib Lodhi
(74) *Attorney, Agent, or Firm* — Arthur J. Samodovitz

(57) ABSTRACT

The invention allows a user to enter a search criteria in a search form once and search multiple web services, search engines and web pages without the need for repeatedly re-creating the search criteria for each web service or search engine because of different and varying supported formats. Once the user has defined their search query, the search query is passed to a query manager in the browser application for formatting the search criteria into a generic query format. The generic query format provides a unified and generic interface to all other query mechanisms supported by different web services, search engines and web pages.

6 Claims, 4 Drawing Sheets

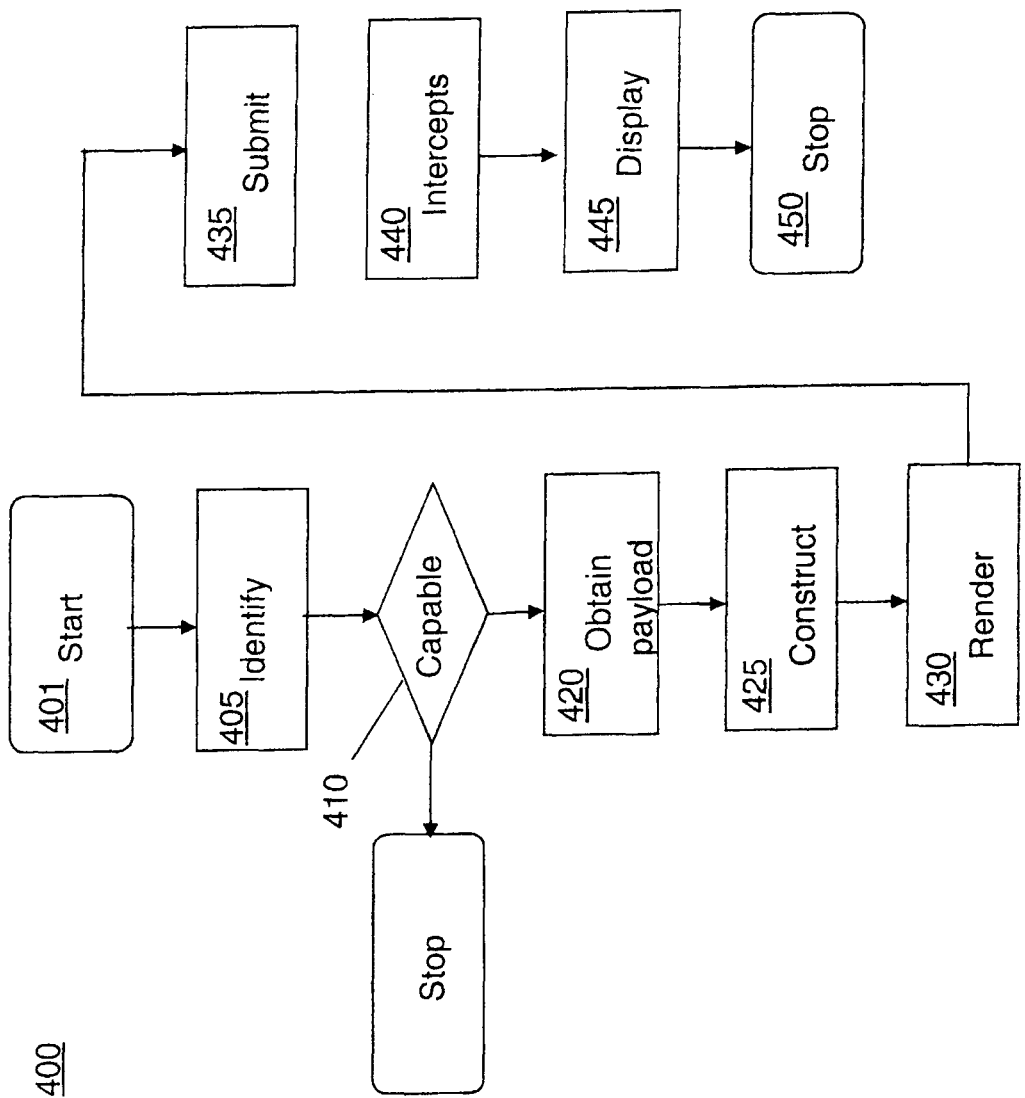

SEARCHING IN A COMPUTER NETWORK

CROSS-REFERENCE TO RELATED APPLICATION

This application is a continuation of co-pending U.S. Ser. No. 10/990,779, filed Nov. 16, 2004, entitled "Searching in a Computer Network", by Nicholas J. Midgley, which published Jun. 2, 2005, as U.S. Patent Publication No. 2005/0120016A1, the entirety of which is hereby incorporated herein by reference

BACKGROUND OF THE INVENTION

The present invention relates generally to a method, system and computer program for searching in a computer network and more particularly, to searching a multiplicity of web sites or a directory accessed via the Internet or an intranet.

Yahoo™ search engine, Google™ search engine and other search engines are currently known to search the Internet. When performing searches over the Internet, or any other type of network such as a corporate Intranet, a user may need to search a number of repositories. The search engine requires the user to fill out a form with search terms and other criteria, or at least to type search terms into a search-specific entry field. A similar sequence of user interactions is required to initiate an Lightweight Directory Access Protocol (LDAP) directory search or a search via the Google™ search engine, i.e. firstly loading a web page and then filling in a form to generate an LDAP directory search request or a Google™ search request. The search engine takes the search criteria and formulates a search string. The search engine compares the search string to the search engine's database of keyword indices and any matches are returned to the user as a "hit list".

To create a database of keyword indices, search engines use software robots or software spiders to crawl the Internet. Each software robot has its own strategy for crawling the Internet, but generally each software robot starts from a predetermined list of historical Uniform Resource Locator (URLs) and from this list locates a document. The software robot may either parse the entire document, the title of the document or the first paragraph. The parsed information is indexed and stored in a database of keyword indices.

In some cases, a search is returned by a search engine displaying a list of successful hits. In other cases, an unsuccessful hit may be returned and the user may be given the option of selecting another link to another web site in which a user may search further in order to delve deeper into the search engine's document repository. This step requires the user to re-enter his or her search query and perform a subsequent search.

An example of the above can be found by using the Google™ search engine. If an unsuccessful (for example a HTTP 404 error) or successful hit, (for example a list of web pages) is returned, a user is given the option of "searching within results". Clicking on this link, a further search page is presented allowing a user to re-enter his or her search query and search within the returned web pages. Alternatively, a user can access another search engine and re-enter his or her search query into the search box to try and locate the results that he or she requires.

The above task when performed repeatedly over a number of search engines or within the same search engine can become repetitive and tedious, requiring repeated entry of a search query in a number of different formats. Often when performing an advanced search, a varying number of parameters are required to be entered, for example, case sensitive letters, keywords only, title only, body only, Boolean operations and specifying the maximum number of documents to be returned etc.

Current web browsers provide a mechanism in which the web browser will remember the last word that a user has typed into the search input box. As a user types in the first few letters of the word, the web browser will begin to match the letters with a word that was previously entered into the input box. For example if a user had previously typed in the word "toaster", the web browser would begin to pattern match (pre-fill the input box) as the user types "t", followed by "o" followed by "a", the user is then able to select the work toaster if that is the word for which the user is looking.

WO 02/091241 discloses a system and a method for distributed real-time search mechanism in a network. Network nodes operating as consumer or requesting nodes generate search requests. Nodes operating as hubs are configured to route the search requests in the network. Communication between nodes in the network may use a query routing protocol. The common query protocol is implemented as a server side protocol and is used to enable business to business services. The user expresses a search query in an appropriate format for each web site, including the selection of various options for example the language of the search. Some systems require authentication to be performed, for example, subscription based repositories, for which normal search services cannot obtain access, and therefore can not return the requested search results.

An object of the present invention is to provide a system, method and program product to facilitate searching through a multiplicity of web sites or a directory accessed via the Internet or an intranet.

SUMMARY OF THE INVENTION

The present invention allows a user to enter search criteria in a search form once and to search multiple web services without the need for repeatedly re-creating the search criteria for each web service or search engine because of different and varying supported formats.

Once the user has defined their search query, the search query is passed to a query manager in the browser for formatting the search query into a generic query format. The generic query format is used to provide a unified and generic interface to all other query mechanisms supported by different web services.

The query manager initially sends a request to the web service or search engine that the user wants to search asking for information on its search capabilities. The request is sent in the form of an Hypertext Transfer Protocol (HTTP) request or any other suitable protocol for communicating requests across a computer network. The target web service responds with a reply indicating its search capabilities and the search parameters that the web service utilises in order to search other web services.

The query manager maps the user's search query saved in the generic query format to the search capabilities and parameters of the target web service. The query manager continues the mapping process for each web service that is to be searched. A web service may pass on the formatted search criteria to other compliant web services. In this instance, a reply message is sent back to the query manager indicating that the search request has been sent onto other compliant web services. The present invention allows a search to be carried out on web services that require registration and authentication services, which would otherwise be out of bounds for a normal search engine. This is because authentication details may be submitted by a user to the query interface manager, such that when a web service challenges the query manager for authentication, the query manager is able to carry out negotiation on behalf of the user.

Once all the replies have been received by the query manager, the replies are aggregated and formatted into a response for passing onto the browser for displaying in the browser window.

The query manager maintains a data store of search queries in the generic query format that the user has elected to be stored for future use and reference. The saved search queries may be organised, for example, into categories of relevance or statistical data may be collated by the query manager to organise the saved queries by the ten most recent queries or by the most searched domain.

A button on the browser's tool bar, a menu option or a floating button within the browser's display window allows a saved search to be retrieved from the data store and submitted to a web service. Associating a saved search query with, for example, a floating button allows the user to execute a search within a child browser window and not just the parent window as would be the case if a button or menu option was coded within an Hypertext Markup Language (html) web page.

Viewed from another aspect, the present invention provides a system for defining a search query in a browser application, the search query permitting a single search query to be submitted across a computer network to a server application for searching one or more web services, the system comprising means for a query manager interface, a query manager and a data store; the query manager interface comprising: means for building a search query from a set of user entered search criteria; the query manager comprising: means for receiving a search query from the query manager interface; means for formatting the received search query into a generic query format; means for requesting and identifying the search capabilities of a web service; means for mapping the search query formatted in the generic query format onto the identified search capabilities of the web service; and means for submitting the mapped search query to the web service for searching and aggregating a response for means for sending the response to the browser application for displaying.

Viewed from another aspect the present invention provides a computer program product directly loadable into the internal memory of a digital computer, comprising software code portions for performing, when said product is run on a computer, to carry out the invention as described above.

BRIEF DESCRIPTIONS OF THE FIGURES

FIG. 4 is a flow diagram showing a sequence of steps of a method for carrying out the search process in accordance with a preferred embodiment of the present invention.

DETAILED DESCRIPTION OF THE PREFERRED EMBODIMENTS

Figure 1:
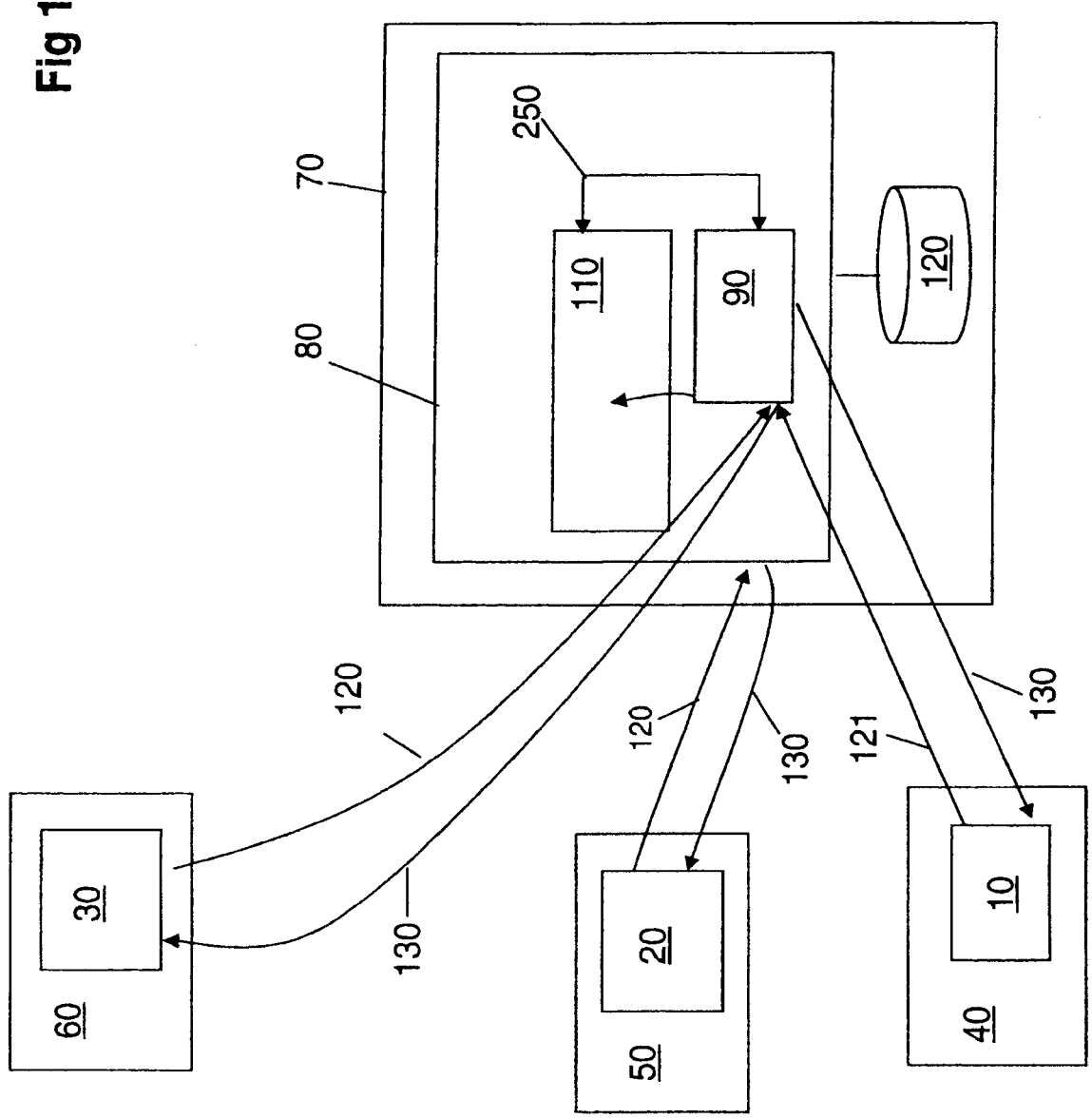
FIG. 1 is a block diagram showing interactions between a web browser and a number of servers within a computer network such as the Internet, according to an embodiment of the invention.

The present invention will now be described in detail with reference to the figures, where like reference numbers indicate like elements throughout. FIG. 1 shows a number of components of a data processing network, including a number of web server programs 10,20,30 running on mainframe servers 40,50,60 that are connected for communication with a user's computer 70. The user's computer 70 is running a web browser program 80 and a query manager 90. As is known in the art, a web browser is an application program which is capable of sending Hypertext Transfer Protocol (HTTP) requests to web servers to access information on the World Wide Web. Alternative embodiments of the invention include browsers or other client requester programs which support the File Transfer Protocol (FTP), Lightweight Directory Access Protocol (LDAP) or other protocols for sending requests. Each of the user's computer 70 and the servers 40,50,60 may be remote from each other within the network, such as if the invention is used for searching for desired web pages on computers connected within the Internet and accessible via the World Wide Web. The user's computer 70 and the server 40,50,60 could equally be components of a local network or intranet.

The user's computer 70 is not limited to a particular type of data processing apparatus, and may be a conventional desktop or laptop personal computer, a personal digital assistant (PDA) or another specialized data processing device which is capable of running a client requester program. The user's computer may connect to a network of data processing systems via wireless or hardwired connections. Similarly, the servers 40,50,60 can be any data processing apparatus which is capable of running a web server, directory server or similar server program. Software-implemented elements of the embodiment described in detail below are not limited to any specific operating system or programming language.

In a first embodiment, the query manager 90 is implemented as a computer program module which extends and modifies the functions of a standard web browser 80. In particular, this embodiment provides a "plug-in" program module for connecting to a standard connection interface of Netscape Corporation's Netscape Communicator web browser program. As is known in the art, "plug-in" modules are programs that can be easily installed and used as part of a Web browser—once installed, "plug-in" modules are recognized automatically by the web browser and the web browser and plug-in modules call each other's functions via a simple API.

A number of "plug-in" components are already widely available for use with Microsoft Corporation's Internet Explorer 5 or Netscape Corporation's Netscape Communicator Web Browsers. At the time of writing this patent specification, an explanation of plug-ins for Netscape Communicator, their use and development is available from Netscape Corporation. Because the interfaces and development of "plug-in" components to add functions to an existing web browser are understood by those skilled in the art, the interfaces and development steps will not be described in detail herein.

A data store 120 cooperates with the query manager 90 to store search queries. The data store 120 may comprise any type of storage and retrieval mechanism, such as, for example, IBM's DB2 database system.

The query manager 90 cooperates with the web browser 80 to process an entry of a search query. The search query is built by invoking the query manager interface 110 and entering a search string and a number of options to define the search query to retrieve accurate search results. The query manager interface 110 may be invoked in a number of ways, for example, by selecting a button from the web browser's 80 toolbar, selecting an option from a menu function or selecting a floating button which is available to the user within a web browser window. The above methods for invoking the query manager interface 110 are not limited to the methods listed above but may comprise other methods of invocation as are known in the art.

Figure 2:
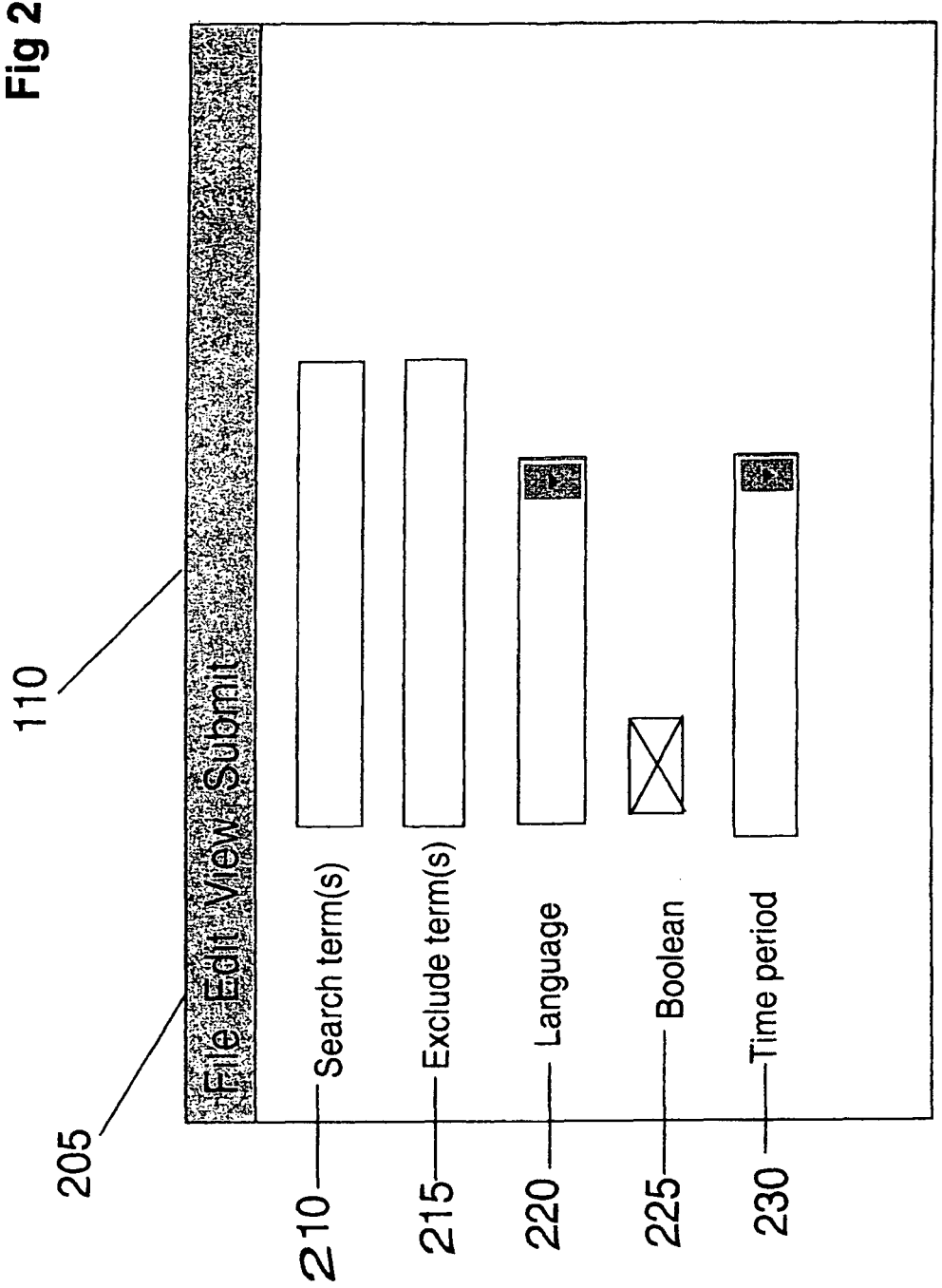
FIG. 2 is an example of the interface in which a use may build a search query.

With reference to FIG. 2, an example of a query manager interface is illustrated. The query manager interface 110 comprises a number of input fields 210, 215, 220, 225 and 230. The input fields allow a user to build and define a search query. The query manager interface 110 further comprises a tool bar 205 for accessing saved search queries, editing saved search queries and submitting search queries to a number of web services for searching. Each web service may be a web page, a web site, a search engine or any other means for obtaining search information or services over a computer network. The query manager interface 110 provides a single search interface for defining a search query and searching multiple web services without the need to repeatedly create the search query for each web site or web service. The query manager interface 110 provides additional input fields which accept user names and passwords for web services that require registration and authentication, which would otherwise be out of bounds for a search engine. The query manager interface 110 may be implemented as an http input form, or other mechanisms providing input of data, for example, a Java program or any other suitable programming language for implementing applications over a computer network (Java in a trademark of Sun Microsystems Inc. in the U.S. and other countries).

In one embodiment of the present invention, communication over the computer network 121, 130 is carried by using a request/reply protocol such as the Hypertext Transfer Protocol (HTTP). In another embodiment, the query manager 90 may issue request/reply messages directly to multiple target web sites via a web service call utilising SOAP messages. SOAP provides the definition of XML based information which may be used for exchanging structured and information in a distributed environment. The query manager interface 110 as illustrated in FIG. 2 is for illustration purposes only, but it will be apparent to a person skilled in the art that the query manager interface may comprise a number of different fields in response to the parameters supplied to the generic query format from XML data feeds containing information on the latest query parameters sent from compliant web services.

The user begins by building his or her search query by defining a search query in one or more of the search entry fields 100 as explained with reference to FIG. 2. The query manager 90 receives the entered search query from the query manager interface 110. The entered search query is stored in the browser's data store 120 in a generic query format. The generic query format may be saved in the data store 120 as an XML schema or in a textual format as dictated by a relational database. The generic query format maintains a list of parameters used to define a search query. The following is an example list of such parameters, but is not limited to the following:

Search Term

The search term defines the word or words that comprise the search criteria which is to be used for the search.

Exclude Term

An example of an excluded word may be "burnt", if a user is searching for recipes on how to create the perfect piece of toast.

Exact Phrase Term

An exact phrase may be used if a user is searching for a specific term, for example, Châteaux Midgley in the Loire region of the South West of France. This enables the search engine to only return the search results that meet the search criteria above.

Boolean Term

A Boolean expression allows a search query to be expressed using notation such as "and", "or" and "not". For example searching for the terms "Babbage and analytical engine", enables the search engine to return search results that comprise the words "Babbage" and "analytical engine" in the same web page.

Mode of Search

Whether the search term is a Boolean search.

Scope of Search

Enables a search to be carried out on a particular domain, for example country specific i.e. the UK or domain specific www.ibm.com.

Language

A search may be limited to a specific language, for example, only search only web sites with the extension.

Time Period

If searching for articles concerning recent new events, articles older that one month ago may be of no use and hence it is possible to limit the search to articles which are one week old. Alternatively if a search is trying to locate articles concerning a subject that took place a year ago, it is further possible to limit the search to articles with dates of twelve months etc. It will also be appreciated by a person skilled in the art that any date settings may be configured for use by the user.

Time Frame

Alternatively it is possible to specify a time frame in which to search documents in, for example date range from/to date range.

File Type

Different types of file types can be defined in the search criteria, for example only search for .pdf files. Other file types include but not limited to doc, html, exe. Zip, ppt,xls,lwp,123 etc.

Occurrences

A user may only be interested in terms that appear in specific parts of a document, for example, a search is requested to return only documents with the words "laser technology in the $21^{st}$ century" in the title. Another example may comprise only returning documents with "Pythagoras theorem" in the body of the document etc.

Location

To enable searching within a specific domain such as www.ibm.com

Results per Page

The search engine will return a designated number of searched per page, for example, the top ten nearest hits.

Chain

Designating a chain allows a search query to be routed to other search providers.

In a preferred embodiment, the above parameters are defined in the generic query format as an XML schema for use in a web services environment. For example, with reference to Example 1, it can be seen that the parameters, days, case, occurrences and language are contained within the coding of the XML format.

Example 1

```
<?—xml version ="1.0" encoding="UTF-8"?>
<!--The definition of the search entered by the user comprising a search phrase and an associated search option)>
<define search query>
<search term></search term>
<time period></time period>
<case (Y|N)> </case>
</define search query>
```

Figure 3:
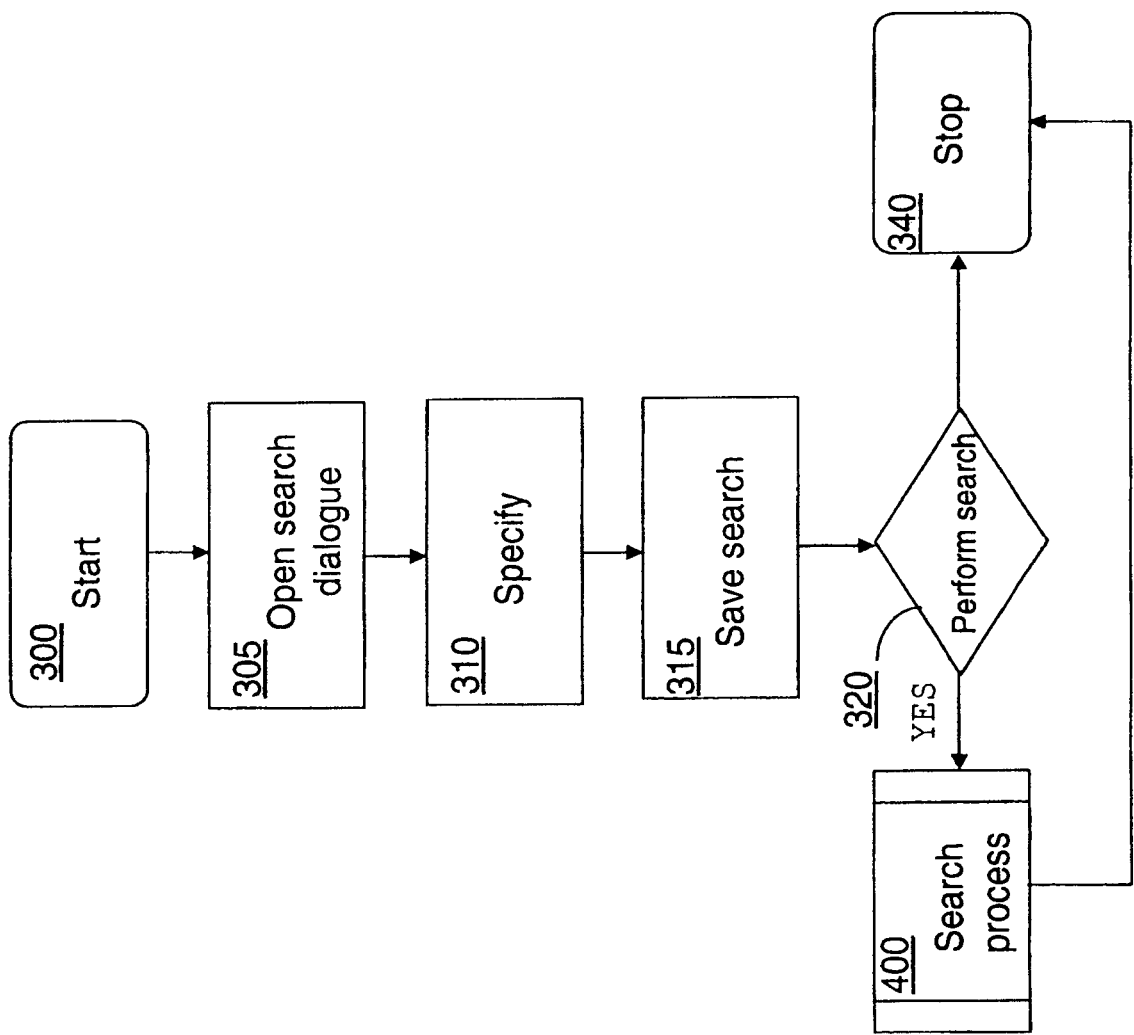
FIG. 3 is a flow diagram showing a sequence of steps of a method for creating a search in accordance with a preferred embodiment of the present invention.

FIG. 3 illustrates the steps that a user may perform to enter, save and submit a search query are explained. At step 305, the user launches the query manager interface 110 and specifies a search criteria at step 310. At step 315, the search query is stored in the generic query format and stored in the data store 120 of the web browser 80 for retrieval by the user.

The query manager 90 maintains the data store 120 of the stored search queries and retrieves the stored search queries according to user defined criteria. For example, the user may define "the most performed active queries", or by a "most searched domain", for example the domain http://www.ibm-.com being a most frequent searched domain.

To enable the search query to be used repeatedly without a need for manually re-entering the search query into the query manager interface 110, the search query is associated with a button, menu function or floating button of the web browser 80. Each time the user wishes to execute a saved search query, the user retrieves from the list of saved search queries, the relevant search query. A menu function or floating button is selected to execute the search. An active search query is available when a new instance of the web browser 80 is created i.e. when a child window is created, for example, in Internet Explorer through invoking File/New/Window or Ctrl+ N from a keyboard connected to the user's computer.

At step 320, the query manager 90 receives the search query from the query manager interface 110 and begins to process the search query 400. At any time, processing of the search query may be stopped at the instruction of the user at step 340.

FIG. 4 illustrates the steps the query manager 90 performs in order to process a search query are explained in further detail. At step 401 the query manager 90 receives the search query from the query manager interface and begins to process the search request. The query manager 90 begins by identifying the search capabilities of the web service to be searched at step 405. Each target web service the user wishes to search may have different search capabilities influenced by the way in which the web service was designed and the programming language or markup language used to implement the design. To illustrate the differences that may occur between a plurality of web services, the following Example 2 illustrates a web page implemented in HTML. As is shown in Example 2 the web page may comprises a plurality of HTML tags. The HTML defines how information should be viewed in a browser.

Example 2

```
<html>
<head>
<meta http-equiv="content-type" content="text/html;charset=iso-8859-1">
<title>XML and Search: SearchTools Report</title>
</head>
<body bgcolor="white">
<h1>This is a heading</h1>
<P>This is a paragraph</P>
</body>
</html>
```

Each HTML page begins with an <html> tag, which informs the browser the markup language being used is HTML. Proceeding the HTML tag, a head tag <head> is used to specify information to the browser about the web page for example, meta information such as an HTML URL encoding reference which allows hexadecimal values to display non standard letters and characters in browsers and plug-in applications.

A title tag enables the web page to be given a title which is displayed in the top most title bar of the browser window. Once the above tags are defined, the body of the HTML page can be developed by including body tags which may define the colour of the HTML page (<body bgcolor="white">), heading tags (<h1> This is a heading </h1>), which define how large the font of the heading should be and a paragraph tag (<P>This is a paragraph</P>), to enter the text of the HTML, therefore specifying how the text of the web page should be used and displayed. HTML does not provide the contents of the text for some search purposes. For example, if the text within a paragraph tag comprised a catalogue of different types of door handles, HTML does not provide any functionality which allows the catalogue to be sorted by, for example, size and colour.

Conversely, XML provides web developers with the aforementioned functionality allowing more control over the data. In order to have more control over the data, further tags and fields can be defined in the XML format which adequately describes the data. Instead of a search engine searching the whole text of an XML page (which a search engine would have to do in an HTML page), search engines may use the XML tags to specify which parts of the XML page to search. Hence there are many differences when performing a search on an HTML page opposed to an XML page.

Further, because different web services accessed by a web browser 80 use different tags to identify entry fields, check boxes and drop down menus etc., only limited pre-filling can take place.

With reference to step 410 of FIG. 4, the query manager 90 begins by issuing a request to the web service, for example, an HTTP request or SOAP message, requesting details of the web services search capabilities. The web service responds with a reply message comprising MIME content type details about the query mechanism that is currently being utilized by the web service (step 420). In another embodiment, the web service may respond using a web services protocol such as SOAP.

Each web service may support different parameters in order to execute a search. Table 1 illustrates these difference between two well known search engines—Alta Vista® and Google™. The parameter column defines the parameters maintained by the query manager 90.

TABLE 1

| Parameter | Altavista ® Mapping | Google ™ Mapping |
|---|---|---|
| Search Term | aqa = "text" | as_q = "text" |
| Exclude Term | aqn = "text" | as_eq = "text" |
| Exact phrase term | aqp = "text" | as_epq = "text" |
| Atleast | <no mapping> | as_oq = "text" |
| Boolean term | aqb = "text" | as_q = "text" |
| Mode of search | aqmode = b\|s | <no mapping> |
| Scope of search | kgs = 0\|1 | <no mapping> |
| Language | kl = <language code> | lr = <language code> |
| Time period | dt = tmperiod\|dtrange | as_qdr = m3\|m6\|y\|all |
| Timeframe | d2 = 1\|2\|3\|4\|5 | <no mapping> |
| Date start | d0 = mm/dd/yy | <no mapping> |
| Date end | d1 = mm/dd/yy | <no mapping> |
| Filetype | filetype = pdf\|html\|<blank> | as_filetype = pdf\|ps\|doc\|xls\|ppt\|rtf\|<blank> |
| Occurrences | <no mapping> | as_occt = title\|body\|url\|link |
| Location | rc = url\|dmn | as_sitesearch = "text" |
| Results per page | nbq = <numeric> | num = <numeric> |
| Chain | <no mapping> | <no mapping> |

The parameters as listed in the first column of Table 1 provide the generic search parameters for the generic query format. The parameters provide a generic reference in which to map onto other query parameters as specified by a compliant web service. The second and third columns detail the respective parameters for the search engines Alta Vista® and Google™. It can be seen that in some cases, there is no equivalent parameters. For example, the Alta Vista® parameter, mode of search, has no equivalent parameter in Google™. The above query parameters are not an exhaustive list, as other query parameters may be available from both search engines and service providers.

To enable parameters defined by the generic query format to be dynamically updated, the query manager 90 may provide an auto update function which allows the download of parameters from compliant web services. This in turn allows the generic query format to be constantly updated in line with parameters of target web sites, web service or search engines (column two and three of Table 1).

Alternatively, the query manager 90 may access a specific web site to download the latest parameter file which contains the most up to date mappings for popular engines. The data contained in the latest downloaded parameter file is extracted and stored in the data store 120 in an appropriate format along with other query parameters.

The generic query format provides a generic format in which all of the parameters from different web services can be linked together to facilitate searching across multiple sites. If no mapping exists i.e. the mapping is not recognized within the query manager, the default position is to ignore the absent parameter.

The query parameters can be sent to the query manager in a number of different ways. For example, in a web services environment, the target web service may send the query parameters in an XML Document Type Definition to the query manager. Once the query manager 90 receives the search capabilities of the web service, the query manager 90 begins to map the search query stored in the generic query format onto the query parameters as requested by the web service to construct a payload at step 420. The query manager parses each of the parameters defined in the generic query format locating the meta data defined in the generic query format's tags (in an XML implementation). A lookup is performed by the query manager 90 to determine the equivalent query parameter of the web service, search engine or web page to be searched (step 430).

The following is an example of a search query received by the query manager 90 from the query manager interface 110 and mapped onto the search parameters as defined by a target web service:
Search item: Charles Babbage
Exclude term: Ada Lovelace
Time period: Dec. 12, 2002 to Nov. 11, 2003

The interface manager 90 receives the search query from the query manager interface 110. In this example the search query is saved as an XML schema.

The query manager 90 sends an http request, or SOAP request depending on the implementation requirements of the web service(s) to be searched, requesting details of the web services search capabilities.

In this example, the reply message defines that one of the web services to be searched requires a DTD format and the other is a web page requiring an HTML format. The reply message further defines the naming convention of the query parameters to be used.

In response to the data supplied in the reply message, the query manager 90 performs a lookup in the data store and determines the equivalent parameter to the generic query parameter. The parameter of the generic query format is mapped onto the query parameter of the web service to be searched. The query manager 90 continues parsing the generic query format until each of the parameters defined in the generic query format has been mapped on to the equivalent query parameters. The resulting output can be seen in the following Example 3 as an XML search query as defined by the web service to be searched.

Example 3

POST/search HTTP/1.1
Host: www.infobase.com
Content-Type: application/soap+xml; charset=utf-8
Content-Length: nnn

```
<?xml version="1.0"?>
<soap:Envelope xmlns:soap="http://www.w3.org/2001/12/soap-envelope"
    soap:encodingStyle="http://www.w3.org/2001/12/soap-encoding">
    <soap:Body xmlns:q="http://www.infobase.com/search">
        <q:query>
            <aqa:searchphrase>
                <aqa:searchitem>Babbage</q:searchitem>
            </aqa:searchphrase>
            <aqa:searchoptions author=""
            case="N" chain="Y" time period="12/12/2002 to
            11/11/2003"
            domain="" format="ANY" Exclude term ="Ada Lovelace"
            geography="" language=""
            occurences="ANYWHERE"
            type="ALLWORDS">searchoptions
            </aqa:searchoptions>
        </q:query>
```

-continued

```
  </soap:Body>
</soap:Envelope>
```

The payload will be constructed depending on the requirements of the web service, search engine or web page to be searched. In one embodiment of the present invention, the search site may support a web services interface and supply the payload as a DTD as in Example 3, or the payload may be constructed as a standard HTTP request. How the payload is constructed depends on the requirements of the web service to be searched.

When performing any search over a computer network it is often the case that multiple searches will occur. In this instance, the query manager 90 will map the search query stored in the generic query format onto many different types of query parameters in order to carry out multiple concurrent searches.

Referring back to FIG. 4, once the search query is in a format accepted by the web service, the query manager 90 submits the payload to the web service for searching at step 430. Then, the web service searches the content of the web site (in accordance with the defined search query) and identifies occurrences of the search terms within the designated web service or web pages, providing its output as a list of identified web pages or other content within the web site.

The query manager 90 intercepts the received search results and aggregates the results, generating a consolidated result which the query manager 90 forwards to the web browser 80 for display at step 440. This intercepting step 435 may involve collating received search responses from different web services before presenting the results back to the user via the web browser 80.

In another embodiment of the present invention, the search query may be repeated a number of times by locating, specifying or retrieving details of other compliant search engines. This may also include the use of directories such as the Universal Description, Discovery and Integration Service (UDDI). These define a set of standard interfaces for accessing a database of web services. Search engine details may be registered in a UDDI directory and can be classified by particular data categories, for example, web services, medical, or information technology. When the web browser 80 receives a response from a search engine, the response may indicate that the search query has been passed on to another cooperating entity that the search engine knows about, that may be able to provide a more accurate answer to the request than the search engine that was originally sent the query.

The invention claimed is:

1. A computer program product for processing a user query entered by a user via a web browser, the user query having a user query format and including search terms to search documents, the computer program product comprising:
one or more computer-readable tangible storage devices and program instructions stored on at least one of the one or more storage devices, the program instructions comprising:
program instructions to translate the user query into a first corresponding query with a common query format different than the user query format;
program instructions to send to a first web service a request to identify a document language and a query format of the first web service, and in response, receive from the first web service a reply indicating that the first web service uses a first document language and a first query format, the first query format being different than the user query format and the common query format;
program instructions to translate the first corresponding query to a second corresponding query with the first query format in the first document language; and
program instructions to send the second corresponding query to the first web service for searching documents;
program instructions to send to a second web service a request to identify a document language and a query format of the second web service, and in response, receiving from the second web service a reply indicating that the second web service uses a second document language and a second query format, the second query format being different than the first query format, the user query format and the common query format, the second document language being different than the first document language;
program instructions to translate the first corresponding query to a third corresponding query with the second query format in the second document language; and
program instructions to send the third corresponding query to the second web service for searching documents.

2. The computer program product of claim 1 wherein the first document language is HTML and the second document language is XML.

3. The computer program product of claim 2 wherein the third corresponding query includes a parameter value for a tag present in the XML but not present in the HTML, the second corresponding query does not include a parameter value for the tag, such that the third corresponding query is limited to data associated with the tag in XML documents whereas the second corresponding query is not limited to data associated with the tag.

4. A computer system for processing a user query entered by a user via a web browser, the user query having a user query format and including search terms to search documents, the computer program product comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to translate the user query into a first corresponding query with a common query format different than the user query format;
program instructions to send to a first web service a request to identify a document language and a query format of the first web service, and in response, receive from the first web service a reply indicating that the first web service uses a first document language and a first query format, the first query format being different than the user query format and the common query format;
program instructions to translate the first corresponding query to a second corresponding query with the first query format in the first document language; and
program instructions to send the second corresponding query to the first web service for searching documents;
program instructions to send to a second web service a request to identify a document language and a query format of the second web service, and in response, receiving from the second web service a reply indicating that the second web service uses a second document language and a second query format, the second query format being different than the first query format, the user query format and the common query format, the second document language being different than the first document language;

program instructions to translate the first corresponding query to a third corresponding query with the second query format in the second document language; and program instructions to send the third corresponding query to the second web service for searching documents.

5. The computer system product of claim 4 wherein the first document language is HTML and the second document language is XML.

6. The computer system of claim 5 wherein the third corresponding query includes a parameter value for a tag present in the XML but not present in the HTML, the second corresponding query does not include a parameter value for the tag, such that the third corresponding query is limited to data associated with the tag in XML documents whereas the second corresponding query is not limited to data associated with the tag.

* * * * *